United States Patent
Oluta

(10) Patent No.: US 6,552,697 B1
(45) Date of Patent: Apr. 22, 2003

(54) METHOD AND APPARATUS FOR GENERATING STEREOSCOPIC THREE-DIMENSIONAL IMAGES

(75) Inventor: Lawrence J. M. Oluta, Scarborough (CA)

(73) Assignee: ATI International S.r.l. (KN)

(*) Notice: Subject to any disclaimer, the term of this patent is extended or adjusted under 35 U.S.C. 154(b) by 0 days.

(21) Appl. No.: 09/295,949

(22) Filed: Apr. 21, 1999

(51) Int. Cl.[7] .................................................. G09G 5/00
(52) U.S. Cl. ...................... 345/7; 345/8; 345/9; 345/32; 345/87
(58) Field of Search ............................ 345/32, 87, 419, 345/7, 8, 9; 358/92, 88; 348/42; 359/462, 465

(56) References Cited

U.S. PATENT DOCUMENTS

| | | | | | |
|---|---|---|---|---|---|
| 4,286,286 A | * | 8/1981 | Jurisson et al. | ................ | 358/92 |
| 4,424,529 A | * | 1/1984 | Roese et al. | ................... | 358/88 |
| 4,562,463 A | * | 12/1985 | Lipton | ........................... | 358/88 |
| 4,647,965 A | * | 3/1987 | Imsand | ........................ | 358/88 |
| 5,883,739 A | * | 3/1999 | Ashihara et al. | ............. | 359/462 |
| 5,905,499 A | * | 5/1999 | McDowall et al. | ......... | 345/419 |
| 5,917,940 A | * | 6/1999 | Okajima et al. | ............. | 382/173 |
| 5,933,127 A | * | 8/1999 | DuBois | ........................ | 345/87 |
| 6,005,607 A | * | 12/1999 | Uomori et al. | ................ | 348/42 |
| 6,195,205 B1 | * | 2/2001 | Faris | ........................... | 359/465 |

* cited by examiner

Primary Examiner—Steven Saras
Assistant Examiner—Alecia D. Nelson
(74) Attorney, Agent, or Firm—Velder, Price, Kaufman & Kammholz

(57) ABSTRACT

A method and apparatus for displaying 3-D stereoscopic images is disclosed. A first stencil is used to filter a right eye image. A second stencil is used to filter a left eye image. Generally, the first and second stencil will have mutually exclusive active areas. The filtered left eye image and filtered right eye image are combined to form a single 3-D image having both images. The combined image is displayed on a conventional monitor, and viewed through the use of a pair or 3-D blue/red type lenses.

25 Claims, 4 Drawing Sheets

METHOD AND APPARATUS FOR GENERATING STEREOSCOPIC THREE-DIMENSIONAL IMAGES

FIELD OF THE INVENTION

The present invention relates generally to the generation of video graphic images, and more specifically to the generation of three-dimensional stereoscopic images on video displays.

BACKGROUND OF THE INVENTION

Various methods exist for generating 3-D images on computer monitors. One type of three-dimensional (3D) image provides a planer three-dimensional image using shading, sizing, and texturizing techniques. Stereoscopic images have been used in order to provide 3-D images that appear to stand out from the plane in which they lie by providing different views to the right eye and the left eye. Alteration of the views creates an illusion that the image is in three-dimensional space as opposed to on the plane of the monitor.

One method of producing 3-D stereoscopic images is to project images onto a screen using different polarized light sources. By projecting a right eye image using a polarized lens having a first orientation, and projecting a left eye image using a different polarized lens having a second orientation orthogonal to the first orientation it is possible for a viewer to observe 3-D images by wearing special glasses. Specifically, each lens of the glasses is polarized and oriented such that the angle of polarization of the lenses is orthogonal to one another to match the polarization of the projected picture. As a result, each eye receives a different image resulting in 3-D images being observed.

By aligning the right lens of the glasses in the same polarization plane as the right lens of the projector, the right eye will see those images projected specifically for the right eye. Likewise, the left lens of the glasses are aligned in the same polarization plane as the left lens of the projector, as a result, the left eye will see those images projected from the left eye projector lens. By aligning the left and right eye lenses orthogonally, it is possible prevent images generated for the opposite eye from being viewed.

The use of polarization techniques is feasible where projection methods are used. However, where projection methods are not used, such as with a monitor used with a personal computer, the ability to individually polarize left and right eye images becomes cost prohibitive.

One method of overcoming the need for polarization of images is to sequentially provide separate left and right eye images in synchronization with special eyeglasses capable of sequentially blocking or transmitting light. This is generally accomplished by controlling each of the right and left lenses of the glasses to be opaque or transparent as needed. In other words, a frame containing left eye data would be synchronized with a pair of viewing glasses such that the left lens of the glasses would be transparent during the left eye frame. During a subsequent right eye frame, the left eye lens would be opaque, while the right eye lens would be transparent. This would allow the image to be seen by only the right eye. By using such an alternating technique at appropriate refresh rates, it is possible to produce the illusion of a 3-D graphics being viewed on a monitor.

One drawback of generating three-dimensional graphics in memory is that in order for each eye to interpret its image as a continuous picture, it must receive the images at a frame rate of approximately 60 hertz. This requires a total frame rate of 120 hertz or better (60 Hz for each eye). This refresh rate is not currently achievable by LCD panels that are beginning to replace traditional monitors. Monitors that can achieve this high frame tend to be cost prohibitive. In addition to monitor limitations, the hardware associated with providing the increased frame rate and the actual viewing glasses or lenses can also be costly.

Therefore, a method and apparatus that would overcome problems associated with the prior art viewing of 3-D images would be desirable.

DETAILED DESCRIPTION OF THE DRAWINGS

In an implementation of the present invention, left and right eye images are blended in order to generate a 3-D stereoscopic image on a computer monitor. In order to accommodate solid images, a mask or a stencil is used to specify which portions of a left eye image, and a right eye image are actually implemented on a data screen. By using mutually exclusive left and right eye stenciling techniques, it is possible for images whether solid or linear, to be displayed in 3-D using a standard refresh rate.

Figure 1:
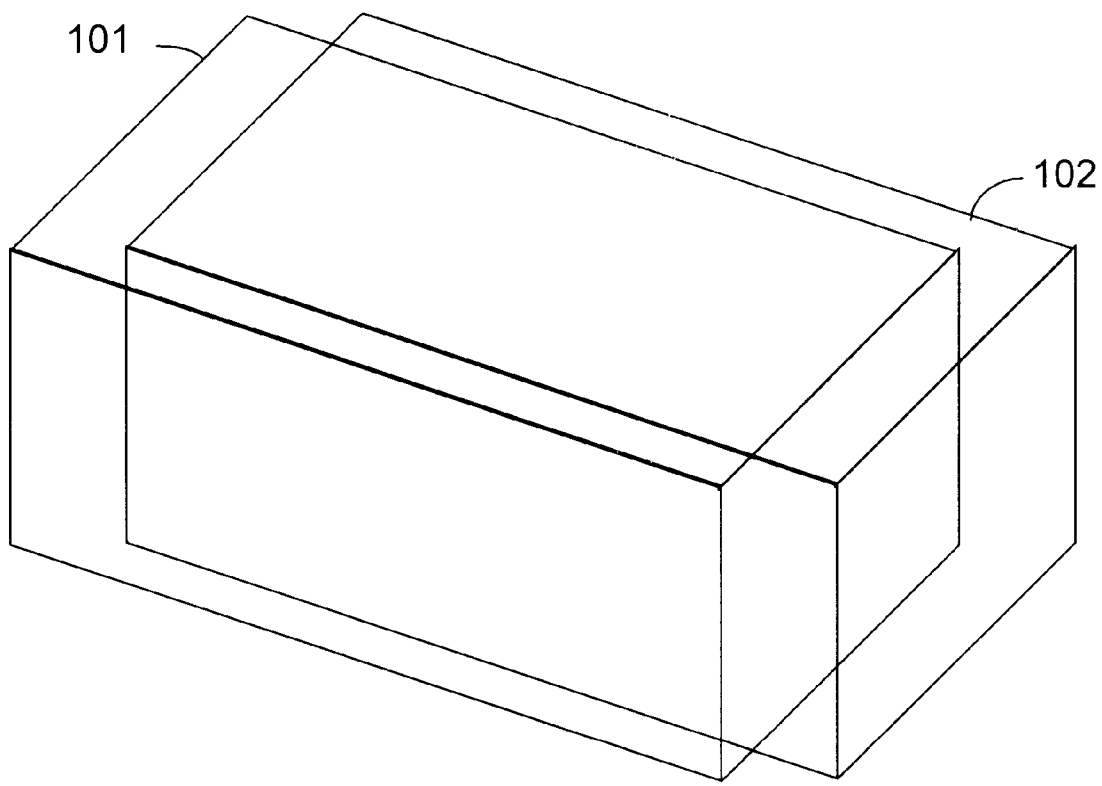
FIG. 1 illustrates the representation of a 3-D image as displayed on a monitor in accordance with the present invention.

FIG. 1 illustrates a stereoscopic image, as viewed on a monitor that includes a simultaneously generated left eye image 102 and a right eye image 101. Generally, the left eye image and the right eye image will be generated using different complementary colors. Generally, blue and red are used for respective individual images. By controlling the depth of color of these images, it is possible to provide varying shades of a color. When viewed through eye-glasses having a left and right eye lenses of complementary colors, each eye will be able to view its associated complementary color image from the screen. Thereby, the lens having the same complementary color as shape 101 will only be able to see shape 101, and the shape 102 would not be visible to that eye. Likewise, the lens having the same color as shape 102 would only be able to perceive the shape 102. As a result, it is possible to provide separate images to the eyes that are interpreted by the mind as having 3-D depth characteristics.

Figure 2:
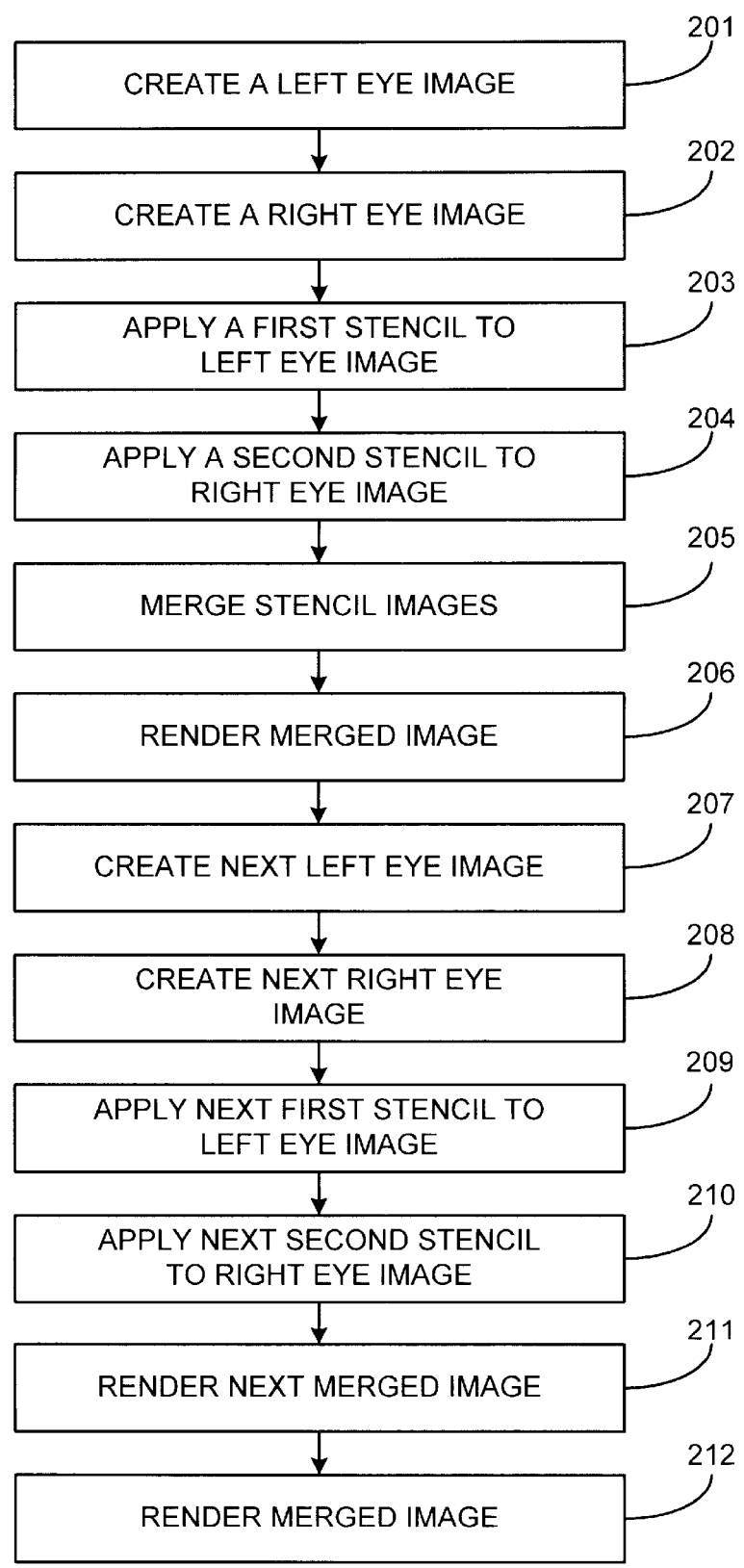
FIG. 2 illustrates a method for projecting a three-dimensional stereoscopic image on a monitor in accordance with the present invention.

FIG. 2 illustrates a method for providing the 3-D images of FIG. 1 onto a computer monitor. In addition, the method of FIG. 2 can be better understood with reference to the images of FIG. 3, which correspond to the specific steps of FIG. 2.

At step 201, a left eye image of a shape (not shown) is created using one of two complementary primary colors. Shape 310 corresponds to providing this left eye image. The primary color of the left eye will generally be either blue or red. At step 202, a right eye image is generated from a complementary primary color not used in step 201. This image corresponds to the shape 320 of FIG. 3.

Figure 3:
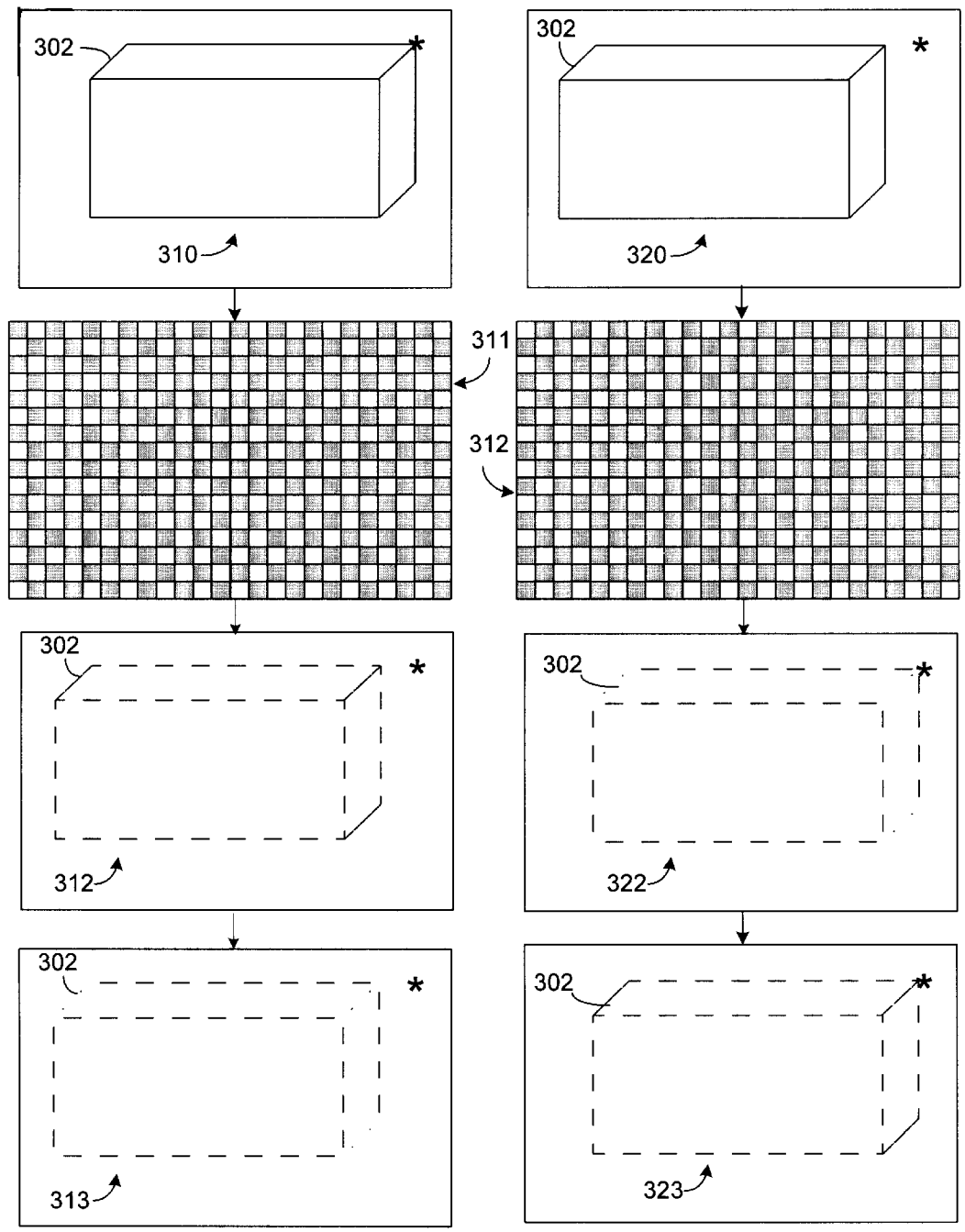
FIG. 3 illustrates representations of specific images as implemented by the method of FIG. 2.

Next, at step 203, a first stencil is applied to the left eye image. In general, the purpose of the stencil is to assure that each image is transmitted with an appropriate amount of data onto the monitor to allow for the image to be seen. Stencil 311 of FIG. 3 illustrates one such stencil. The stencil 311 has an alternating checkerboard pattern, whereby every other pixel in a horizontal or vertical orientation is active. An active space on the stencil 311 corresponds to a pixel location, which will allow one or more pixels to be transmitted. The stencil 311, as illustrated in FIG. 3 will transmit pixels through the clear locations, and would absorb pixel information in the shaded areas.

Next, at step 204, a second stencil is used in order to generate a stenciled right eye image. Referring to FIG. 3, stencil 321 illustrates a second such stencil. Note that a similar checkerboard pattern as that of stencil 311 is used. However, the stencil 321 has active locations mutually exclusive of those in stencil 311. In other words, locations that are active in stencil 311 are inactive, or shaded, in stencil 321. In other embodiments, it will be possible to use other stencil patterns. In addition, it would be possible to have some stencil locations overlapping. In other words, the active and inactive areas need not be completely mutually exclusive between the first and the second stencils. However, as a general rule, a stencil having greater overlapping than approximately 20% may reduce video quality to the extent that the overlapping will be visible to the user and thereby not practical. In addition, it can be useful to use other stencil patterns in order to avoid specific features from being completely filtered out. This will be discussed in more detail herein.

Next, at step 205, the stenciled left eye image and the stenciled right eye image are merged into a single image. This merged image represents a frame of data corresponding to the image of FIG. 1. Note, however, that one difference between the image of FIG. 1, and the image created by combining the stenciled left and right eye images 312 and 322 of FIG. 3, is that the merged image of stenciled images 312 and 322 will look perforated because the stencils 311 and 321 will remove a portion of each image. However, when viewed with appropriate 3-D lenses, the image will look as a solid image because the image viewed by the user will have the left and right eye stenciled images coincident with one another, thereby filling the voids that occur.

In order to create a 3-D stereoscopic image that does not flicker, it will be necessary for alternate frames of video to swap the stencils 311 and 321 such that stencil 321 will be used to filter the left eye image 310 for the second frame and the stencil 311 will be used to filter the right eye image 320 for the second frame. By swapping stencils 311 and 321 in alternate frames, a more uniform 3-D graphic is generated. For example, the image 312 of frame 1 has the edge 302 displayed only in the left eye graphic. As a result of the specific selection of the stencil 321, the right eye graphic 312 of frame 1 is missing the edge 302. If the image and stencils remain unchanged, the right eye will never receive an input to create the edge 302. However, by swapping the stencils 311 and 321, complementary stenciled left and right eye images are created. Image 313 is complementary to image 322, and 312 is complementary to 323. As a result, at least once every other frame, each eye receives input for each feature of a stationary object.

When a feature is being animated in 3-D stereoscopic manner, the problem of disappearing edges is not as significant because animated shapes will generally disappear for a single frame and reappear in an adjacent frame, thereby not being perceptible to the eye. Another manner of reducing the disappearing effect is to use a different stencil patterns from those illustrations in FIG. 3. As can be seen in stencil patterns 311 and 321, a diagonal line cutting across the pattern runs the risk of being completely eliminated in any given frame. By using different stencil patterns that don't block all diagonals it is possible to prevent diagonal lines from being completely masked out.

Figure 4:
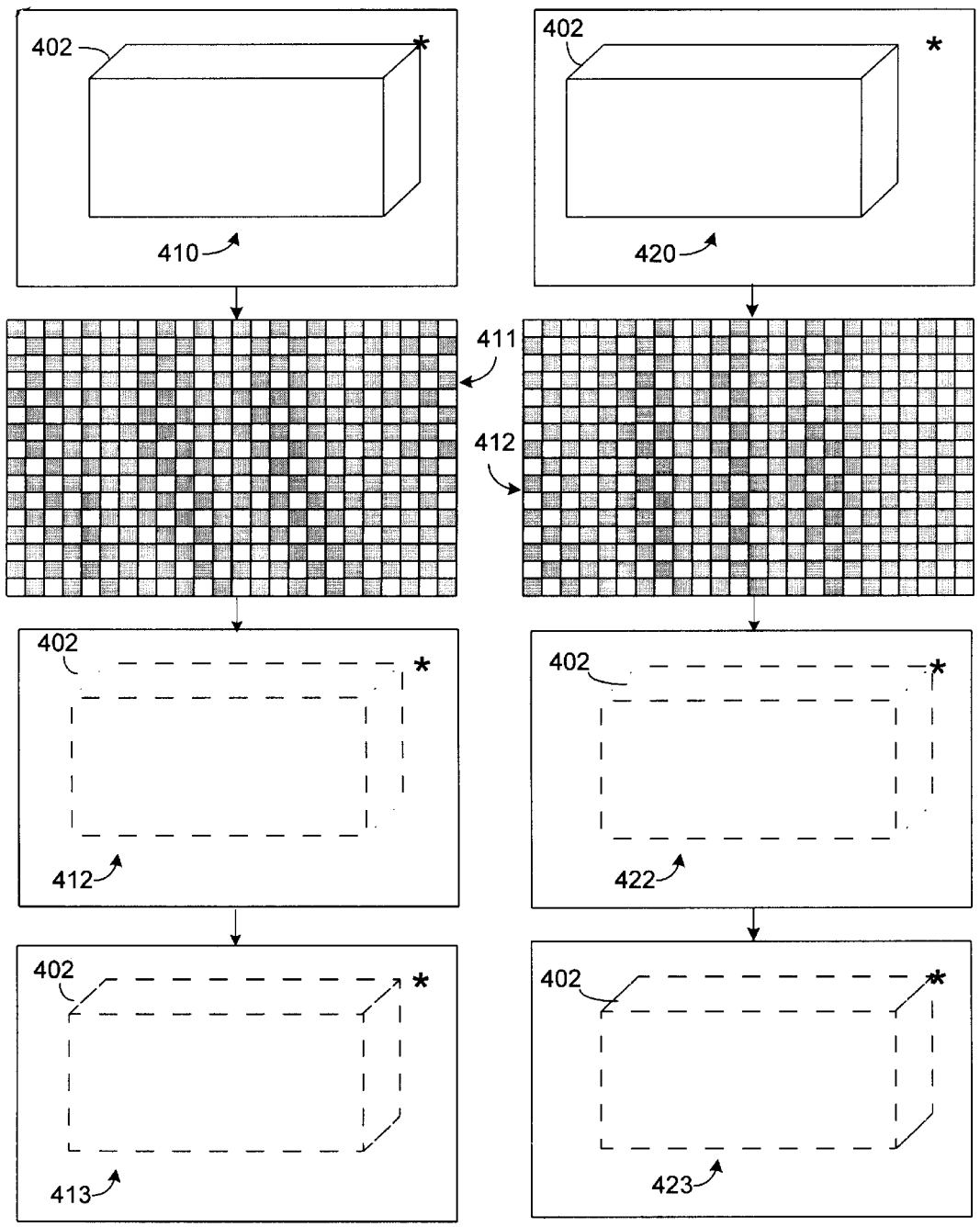
FIG. 4 illustrates another set of images corresponding to the method steps of FIG. 2.

The illustrations of FIG. 4 corresponds to the illustrations of FIG. 3. However, the image 410 has been shifted from image 420 by one feature size of the stencil 411. A feature size of stencil 411 is the width of one of the checker board squares which mask the image. Likewise, stencil 411 is equivalent to stencil 421 shifted by one feature size. As a result, the stenciled left eye image 412 and the stenciled right eye image 422 are identical images, except for the offset. Likewise, stenciled images 413 and 423 are identical to one another. The result of having identical left and right-eyed images is that a flicker of the viewed stereoscopic image can occur. One way of resolving this situation is to base the feature size of the stencil on the image. By choosing the feature size to be different from the amount that the image is to be shifted will avoid the flicker problem. The feature size can also be based on a pixel size, with the smallest feature size being one pixel.

As discussed previously, wherein animation using the stereoscopic 3-D image is occurring, the flicker effect will not necessarily be noticeable because the images will only occasionally be shifted by the same amount. However, where stationary images are used, such as illustrated herein, it may be necessary to detect when this situation has occurred and adjust for it by using different stencils, or to use an asymmetrical stencil pattern in order to reduce these effects upon stationary images.

By using stencils of the type illustrated in FIGS. 3 and 4, it is possible to display on a video screen, during a single frame, both left and right eye images capable of being filtered through the use of traditional red and blue 3-D glasses. By alternating the stencils between the right eye image and the left eye image, it is possible to smooth out anomalies that occur as a result of this filtering.

The specific method put forth herein can be executed upon a computer system having a data processor. The data processor would generally execute instruction capable of implementing the images, and the stenciling of the images discussed herein. In general, the data processor may include a processing module and memory. The processing module may be a single processing device or a plurality of processing devices. Such a processing device may be a microprocessor, microcontroller, digital signal processor, microcomputer, portion of the central processing unit, state machine, logic circuitry, and/or any device that manipulates signals (e.g., analog or digital) based on operational instructions. The memory may be a single memory device or a plurality of memory devices. Such a memory device may be a read-only memory, random access memory, floppy disk memory, magnetic tape memory, erasable memory, portion of system memory, and/or any device that stores operational instructions in a digital format. Note that when the processing module implements one or more of its functions via a state machine or logic circuitry, the memory storing the corresponding operational instructions is embedded within the circuitry comprising the state machine and/or logic circuitry.

In other embodiments, a specific video engine could be incorporated whereby each of the left and right eye images can be generated by dedicated hardware, or specialized software instructions. The left and right eye images can then be combined also using specialized hardware or software in order to produce a frame capable of being rendered on a video monitor.

It should be readily apparent that the present invention discloses a method of implementing a stereoscopic 3-D image on a conventional video monitor without the need for expensive techniques or lenses. One of ordinary skill in the art will readily recognize that multiple variations of the present invention could be incorporated without departing from the scope of the present invention. For example, various stencil patterns could be used in order to meet specific objectives of applications, and varying primary colors other than red and blue could be used.

I claim:

1. A method of displaying video graphics, the method comprises the steps of:

applying a first stencil to a first representation of an image to create a right eye image;

applying a second stencil to a second representation of the image to create a left eye image wherein the first stencil masks a first set of pixel locations and the second stencil masks a second set of pixel locations, wherein the first and second set of stencil locations are substantially mutually exclusive, including no more than 20 percent common elements between the first set and the second set; and providing the right eye image and the left eye image simultaneously to a display port.

2. The method of claim 1, wherein:

the step of applying the first stencil creates a right eye image for a first frame;

the step of applying the second stencil creates a left eye image for a first frame; the method further comprising:

applying the second stencil to a third representation of the image to create a right eye image for at least one second frame; and applying the first stencil to a fourth representation of the image to create a left eye image for the at least one second frame.

3. The method of claim 2, wherein the third representation is approximately the same as the first representation, and the fourth representation is approximately the same as the second representation.

4. The method of claim 1, wherein the stencil has a stencil feature size that is based on the image.

5. The method of claim 1, wherein the stencil has a stencil feature size that is based on a pixel size.

6. The method of claim 5, wherein the stencil feature size is equal to a pixel dimension.

7. The method of claim 1, wherein the step of applying a first stencil includes applying the first stencil by using a data processor.

8. The method of claim 7, wherein the data processor is a main system processor.

9. The method of claim 7, wherein the data processor is a graphics engine.

10. The method of claim 1, wherein the step of creating the right eye image includes the sub step of applying a first color to a representation of the image to create the right eye image; and the step of creating the left eye image includes the sub step of applying a second color to a representation of the image to create the left eye image.

11. The method of claim 10, wherein the first and second colors are complementary colors.

12. The method of claim 11, wherein the first and second colors are primary video colors.

13. A method of displaying video graphics, the method comprises the steps of:

applying a first stencil to a first representation of an image to create a right eye image for a first frame;

applying a second stencil to a second representation of the image to create a left eye image for the first frame;

providing the first frame to a display port;

applying the second stencil to a third representation of the image to create a right eye image for at least a second frame; and applying the first stencil to a fourth representation of the image to create a left eye image for the second frame.

14. The method of claim 13, wherein the third representation is approximately the same as the first representation, and the fourth representation is approximately the same as the second representation.

15. The method of claim 13, wherein the stencil has a stencil feature size that is based on the image.

16. The method of claim 13, wherein the stencil has a stencil feature size that is based on a pixel size.

17. The method of claim 16, wherein the stencil feature size is equal to a pixel dimension.

18. The method of claim 17, wherein the step of applying a first stencil includes applying the first stencil by using a data processor.

19. The method of claim 18, wherein the data processor is a main system processor.

20. The method of claim 19, wherein the data processor is a graphics engine.

21. The method of claim 13, wherein the step of creating a right eye image includes the sub step of applying a first color to a representation of the image to create the right eye image; and the step of creating a left eye image includes the sub step of applying a second color to a representation of the image to create the left eye image.

22. The method of claim 21, wherein the first and second colors are complementary colors.

23. The method of claim 22, wherein the first and second colors are primary video colors.

24. A data processor system comprises:

a processing module; and a memory operably coupled to the processing module, wherein the memory stores operational instructions that cause the processing module to:

create a right eye image for a first frame of video by applying a first stencil to a first representation of the image;

create a left eye image for the first frame of video by applying a second stencil to a second representation of the image;

provide the first frame of video to a display port;

create a right eye image for at least one second frame; and create a left eye image for the at least one second frame.

25. The data processing system of claim 24, wherein the memory further comprises operational instructions that cause the processing module to apply the second stencil to a third representation of the image to create the right eye image for the at least one second frame;

apply the first stencil to a fourth representation of the image to create the left eye image for the at least one second frame.

* * * * *